(12) United States Patent
Schmidt

(10) Patent No.: US 9,221,208 B2
(45) Date of Patent: Dec. 29, 2015

(54) DEVICE FOR CONTROLLING BLOWING MEDIUMS IN A STRETCH BLOW MOULDING MACHINE

(71) Applicant: Eugen Seitz AG, Wetzikon (CH)

(72) Inventor: Joachim Schmidt, Hettlingen (CH)

(73) Assignee: Eugen Seitz AG, Wetzikon (CH)

( * ) Notice: Subject to any disclaimer, the term of this patent is extended or adjusted under 35 U.S.C. 154(b) by 0 days.

(21) Appl. No.: 14/458,715

(22) Filed: Aug. 13, 2014

(65) Prior Publication Data

US 2015/0050381 A1    Feb. 19, 2015

(30) Foreign Application Priority Data

Aug. 14, 2013 (EP) .................................... 13405100

(51) Int. Cl.
*B29C 49/42* (2006.01)
*F16K 27/00* (2006.01)
*B29K 67/00* (2006.01)
*B29C 49/46* (2006.01)

(52) U.S. Cl.
CPC ........... *B29C 49/4289* (2013.01); *F16K 27/003* (2013.01); *B29C 49/46* (2013.01); *B29K 2067/003* (2013.01)

(58) Field of Classification Search
CPC .......................... B29C 49/4289; F16K 27/003
See application file for complete search history.

(56) References Cited

U.S. PATENT DOCUMENTS

| | | | |
|---|---|---|---|
| 7,927,093 B2 | 4/2011 | Leblond et al. | |
| 8,262,384 B2 * | 9/2012 | Blochmann | 425/535 |
| 2003/0118686 A1 * | 6/2003 | Voth et al. | 425/529 |
| 2008/0069914 A1 * | 3/2008 | Lemaistre | 425/146 |
| 2008/0213423 A1 * | 9/2008 | Leblond et al. | 425/536 |
| 2009/0039569 A1 * | 2/2009 | Finger et al. | 264/572 |
| 2012/0199779 A1 | 8/2012 | Elbs | |
| 2012/0201918 A1 | 8/2012 | Elbs | |
| 2012/0241012 A1 | 9/2012 | Studer | |

FOREIGN PATENT DOCUMENTS

DE             203 05 232 U1    5/2003

OTHER PUBLICATIONS

Office Action for European Application No. 13 40 5100 dated Jan. 30, 2014.

* cited by examiner

*Primary Examiner* — Robert B Davis

(74) *Attorney, Agent, or Firm* — Alston & Bird LLP

(57) ABSTRACT

The present invention relates to a device for controlling blowing mediums in a stretch blow moulding machine for producing hollow bodies of heated preforms, wherein the device comprises a housing block with a first through-bore for accommodating at least one blow nozzle. In addition, a first and a second valve are provided, wherein these valves are in fluid communication with the first through-bore and configured for selectively connecting a blow nozzle accommodated in the through-bore to a fluid connection. In order to simplify the construction of the device and to prevent leakages, the housing block furthermore comprises first and second valve channels for accommodating the first and the second valve within the housing block, wherein the first and second valve channels are in fluid communication with the first through-bore.

19 Claims, 6 Drawing Sheets

DEVICE FOR CONTROLLING BLOWING MEDIUMS IN A STRETCH BLOW MOULDING MACHINE

CROSS-REFERENCE TO RELATED APPLICATIONS

This application claims the benefit of European Application No. EP 13405100.2 entitled "Device for Controlling Blowing Mediums in a Stretch Blow Moulding Machine," filed Aug. 14, 2013, the contents of which are incorporated herein in their entirety.

FIELD

The present invention relates to a device for controlling blowing mediums in a stretch blow moulding machine for producing hollow bodies of heated preforms according to the preamble of independent Claim 1.

BACKGROUND

Blow moulding machines are sufficiently known from the prior art. Hollow bodies with volumes between 0.05 and 20 liters are typically produced of thermoplastic polymers in these blow moulding machines. Typical blow-moulded parts are bottles, as well as transport, packaging and storage containers. At present, it is preferred to use polyethylene terephthalate (PET) for bottles and containers with a content up to 20 liters.

Blow moulding machines that are configured, for example, for PET bottles are known in different variations (with and without mechanical stretching rod). In this case, the tubular or bell-like blow nozzle is directly attached, for example, to the opening of a preform or to a transporter carrying this preform in a gas-tight manner in order to connect the preform to low-pressure blowing air, high-pressure blowing air or an air vent opening. The pressurization of the preform with low-pressure blowing air or high-pressure blowing air is usually realized with a plurality of control valves that are connected to the blow nozzle.

Nowadays, the industrial stretch blow moulding machines currently available on the market reach production rates of up to 80,000 bottles per hour, which is the reason why of course particularly fast control valves need to be constructed for the pressurization of the preform with low-pressure blowing air or high-pressure blowing air, respectively. In this context, it is important that the build-up and also the discharge of an air pressure up to 40 bar (high-pressure blowing air) are accomplished as fast as possible. In one known method, this is achieved by maintaining the so-called "dead air volume" as small as possible. The term "dead air volume" refers to the air column that is situated between the control valve and the preform to be blown. Since this "dead air volume" is deaerated with the air volume blown into the bottle, it furthermore causes a waste of high-pressure blowing air and therefore a waste of energy.

In this context, it is referred, for example, to U.S. Pat. No. 7,927,093 B2 that already deals with the reduction of the "dead air volume." To this end, U.S. '093 B2 proposes to detachably mount a valve housing, that contains all required control valves, on the front side of the housing block of the blow nozzle. However, this measure is not only intended for achieving a reduction of the dead air volume; in fact, the detachable mounting of the valve housing on the housing block of the blow nozzle significantly simplifies the maintenance of the blow moulding machine.

The device for controlling blowing mediums in a stretch blow moulding machine known from the prior art has the disadvantage that it can only be produced with substantial constructive effort. In particular, it is necessary to fabricate two housings (valve housing, housing block of the blow nozzle) that are almost perfectly adapted to one another and to connect these housings to one another in compliance with minimal tolerances. Furthermore, the interface between the valve housing and the housing block needs to be elaborately sealed in the known device in order to prevent leakages.

Based on the above-defined problem, it is the object of the present invention to disclose a device for controlling blowing mediums in a stretch blow moulding machine that minimizes the dead air volume between the control valves and the blow nozzle and also features a particularly simple construction.

SUMMARY

According to the invention, the aforementioned object is solved by a device according to independent Claim 1.

Accordingly, the device according to the invention comprises a housing block with a first through-bore for accommodating at least one blow nozzle. In addition, a first and a second valve are provided, wherein these valves respectively are in fluid communication with the first through-bore and configured for selectively connecting a blow nozzle accommodated in the through-bore to a first or a second fluid connection, respectively. The fluid connection may consist, for example, of a high-pressure or low-pressure connection or of an air vent connection that preferably contains a gaseous medium, for example air.

According to the invention, the device is particularly characterized in that the housing block comprises first and second valve channels for accommodating the first and second valves within the housing block. Thereby, the first and second valve channels are in fluid communication with the first through-bore, in which the blow nozzle is accommodated.

The device according to the invention for controlling blowing mediums in a stretch blow moulding machine has a number of advantages. Due to the above-described valve channels, for example, the control valves are directly integrated into the housing block of the blow nozzle such that the device according to the invention can be produced in only two machine set-ups. In particular, it is, thus, no longer necessary to produce a separate valve housing, as well as a housing block for the blow nozzle, such that the costs and the material input can be reduced. As a result, the device according to the invention is more compact such that the space requirement of the stretch blow moulding machine is significantly reduced. Furthermore, the lack of an interface between the valve housing and the housing block of the blow nozzle eliminates the need for seals and screws such that the installation is simplified and the risk of leakages or errors during the installation is reduced.

Advantageous embodiments of the device according to the invention are disclosed in the dependent claims.

In a first embodiment of the device according to the invention for controlling blowing mediums, it is proposed that the first and the second valve channel are essentially aligned perpendicular to the first through-bore. As described in greater detail below, the essentially perpendicular alignment of the first and the second valve channel to the through-bore reduces the dead air volume to a minimum because the valve channels can be arranged particularly close to the through-bore of the blow nozzle.

According to another aspect, it is proposed that the first valve channel is aligned essentially perpendicular to the second valve channel such that the first and the second valve are arranged crosswise in order to additionally reduce the dead air volume. In this context, it should be noted that the control valves known from the prior art usually comprise a control side that has a larger diameter than the high-pressure side. According to this embodiment, the valves therefore can be lined up closer to one another without the control sides of the valves with the larger diameter contacting one another. Consequently, the device according to the invention can be constructed in a more compact fashion such that the dead air volume being created can be significantly reduced. Furthermore, the crosswise arrangement still allows good service access to the valves.

The term "essentially perpendicular" does not mean that the individual valve channels necessarily have to be exactly aligned at an angle of 90° relative to one another. In fact, this formulation includes any angle that allows a crosswise arrangement of the valves. Consequently, "essentially perpendicular" merely means that the valve channels are alternately arranged on different lateral faces of the housing block, wherein the ends of the valves on the low-pressure side (i.e. on the control side) respectively intersect the longitudinal axis of a common collecting pipe (=second through-bore; see below). In concrete embodiments, the valve channels or the valves therefore may also be aligned, e.g., at an angle between 70 and 110° relative to one another.

According to another aspect of the device according to the invention, the housing block furthermore comprises a second through-bore that is realized in the form of a collecting channel, wherein this second through-bore extends parallel to the first through-bore and is in fluid communication with the first and the second valve channel, as well as with the first through-bore. In this context, the term "collecting channel" refers to a through-bore that extends parallel to the first through-bore and connects the first and the second valve channel to the first through-bore. In other words, the high-pressure side of the valves is respectively connected to the collecting channel that connects these valves to the first through-bore. Since all valves preferably are in fluid communication with the first through-bore via a single collecting channel, the dimensions of the housing block can be reduced further such that the "dead air volume" is minimized.

Apart from the first and the second valve, the device may also comprise an arbitrary number of additional valves that respectively are in fluid communication with the first through-bore and configured for selectively connecting the blow nozzle accommodated in the through-bore to an arbitrary number of additional fluid connections. Analogous to the first and second valves, it is proposed that the housing block furthermore comprises an arbitrary number of additional valve channels for accommodating the corresponding valves within the housing block. In this case, the corresponding valve channels naturally are also in fluid communication with the first through-bore. According to a preferred embodiment, it is proposed, in particular, that the device furthermore comprises third, fourth and fifth valves, as well as additional valves, that respectively are in fluid communication with the first through-bore, wherein the housing block consequently comprises third, fourth and fifth valve channels, as well as additional valve channels, for accommodating these valves. It is accordingly beyond debate that the control options of the blow moulding machine can be significantly improved by providing additional valves. In addition to an air vent valve, it would therefore also be possible, for example, to provide a valve for recycling the already used high-pressure blowing air. In this way, it would also be conceivable to provide a number of different blowing pressures.

According to a preferred embodiment, it is proposed that at least one low-pressure valve, one high-pressure valve and at least one air vent valve are provided. A recycling valve may furthermore be provided. Additional valves may be configured for providing blowing pressures that are between the low pressure and the high pressure.

As already mentioned above with reference to the first and the second valve channel, it is advantageous to arrange the valve channels crosswise. According to another embodiment, it is therefore proposed that the additional valve channels such as, e.g., the third, fourth and fifth valve channels are essentially aligned perpendicular to the first through-bore, wherein the first, third, fifth and, if applicable, additional odd-numbered valve channels are respectively aligned perpendicular to the second, fourth and, if applicable, additional even-numbered valve channels such that the valves are arranged crosswise. Accordingly, the "dead air volume" is efficiently reduced.

In the above-described crosswise arrangement of the valves, it is preferred to realize the housing block essentially rectangular, wherein the first, third, fifth and, if applicable, additional odd-numbered valve channels are respectively arranged on a first lateral face of the housing block, and wherein the second, fourth and, if applicable, additional even-numbered valve channels are respectively arranged on a second lateral face of the housing block that extends perpendicular to the first lateral face. In other words, every second valve channel and, thus, every second valve is arranged parallel along the collecting channel such that a crosswise arrangement of the valves is alternately realized. This arrangement is especially advantageous with respect to the reduction of the dead air volume. This particularly is the case if, according to another aspect, the valves respectively comprise a control side that faces away from the first through-bore and has a diameter that is larger than the diameter of a high-pressure side of the respective valve that faces the first through-bore. In other words, the valves can be analogously described as wedges that are pushed into one another in order to ensure a possibly dense arrangement. In this way, all valves can extend particularly close to the first through-bore such that the dead air volume is reduced and, thus, the switching times of the blow moulding machines can be shortened.

According to another embodiment, the device may furthermore comprise a connecting block that is detachably connected to the housing block and designed for connecting each of the fluid connections to a connecting line. For example, the connecting block may be arranged on the housing block by means of fastening elements (such as screws) in order to connect this housing block to an air pressure wave or to an air vent opening, respectively. In particular, the connecting block allows to simultaneously connect all fluid connections to their respective connecting line such that the installation time is significantly reduced.

According to another aspect, the device may comprise at least one pilot valve for each control valve, wherein said pilot valves are detachably connected to the housing block and configured for actuating the valves located in the housing block. The pilot valves are preferably realized in the form of solenoid valves such that the switching times of the device according to the invention can be optimized. The pilot valves may be mounted on the outer side of the housing block, for example, by means of screw connections. In this context, it should be noted that the housing block accordingly comprises additional connecting channels that connect the pilot valves to the valves located on the housing block.

BRIEF DESCRIPTION OF THE SEVERAL VIEWS OF THE DRAWINGS

The device according to the invention is described in greater detail below with reference to the embodiments illustrated in the figures.

In these figures.

DETAILED DESCRIPTION

In the following detailed description of the figures, identical or identically acting components are identified by the same reference symbols.

Figure 1:
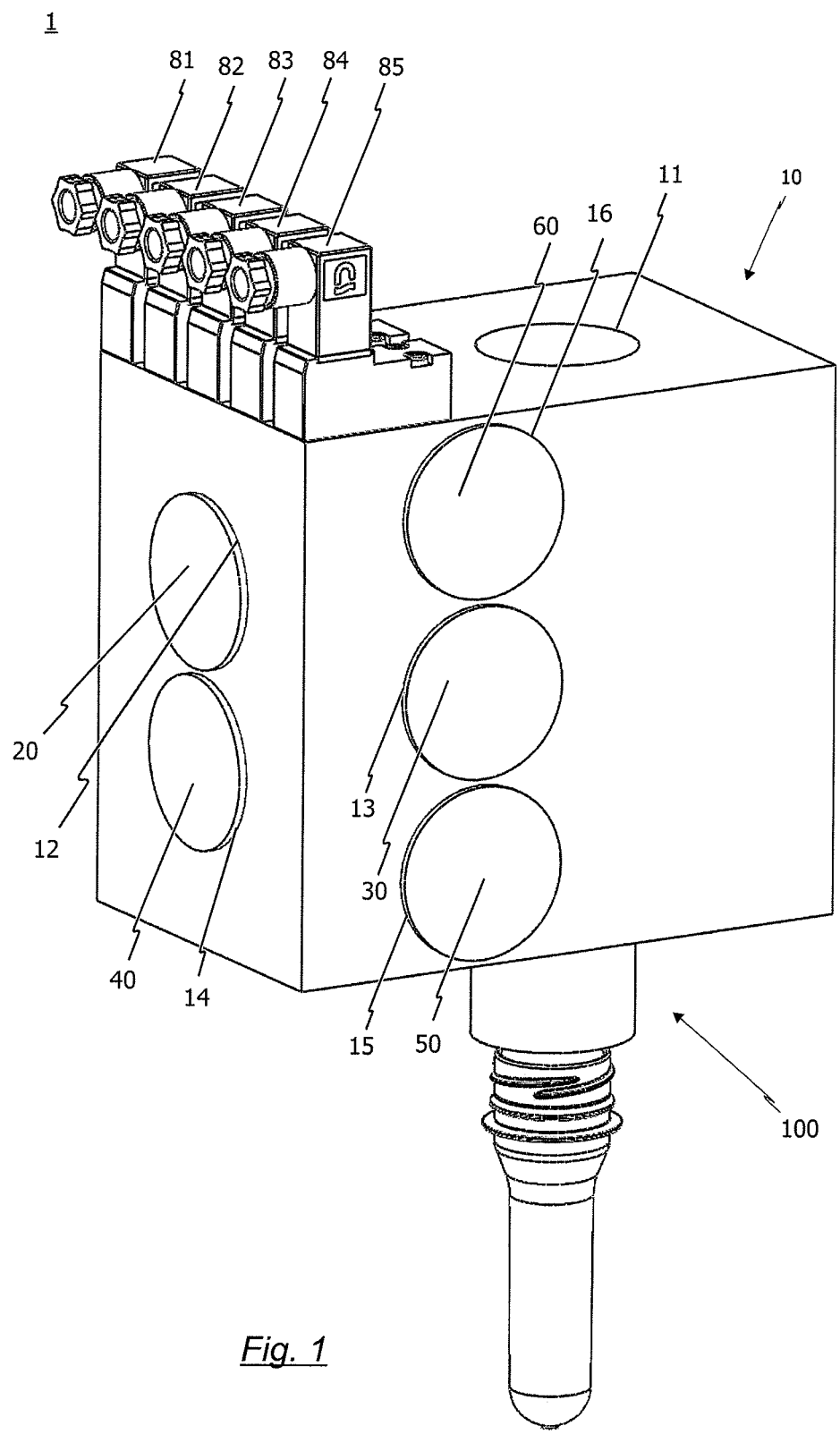
FIG. 1 shows a perspective front view of a first embodiment of the device according to the invention for controlling blowing mediums in a stretch blow moulding machine.
Figure 2A:
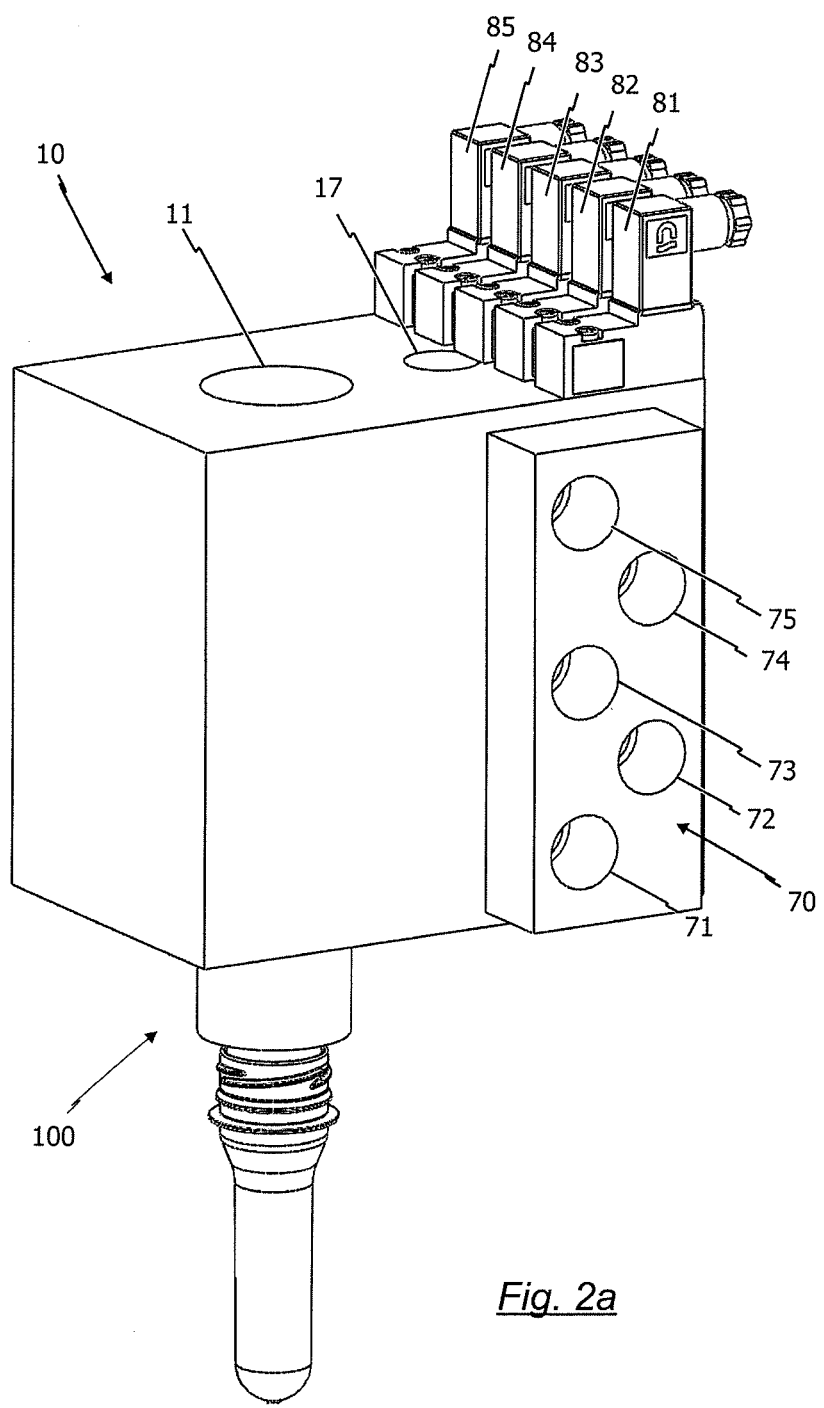
FIG. 2a shows a perspective rear view of the embodiment illustrated in FIG. 1 with connecting block.
Figure 2B:
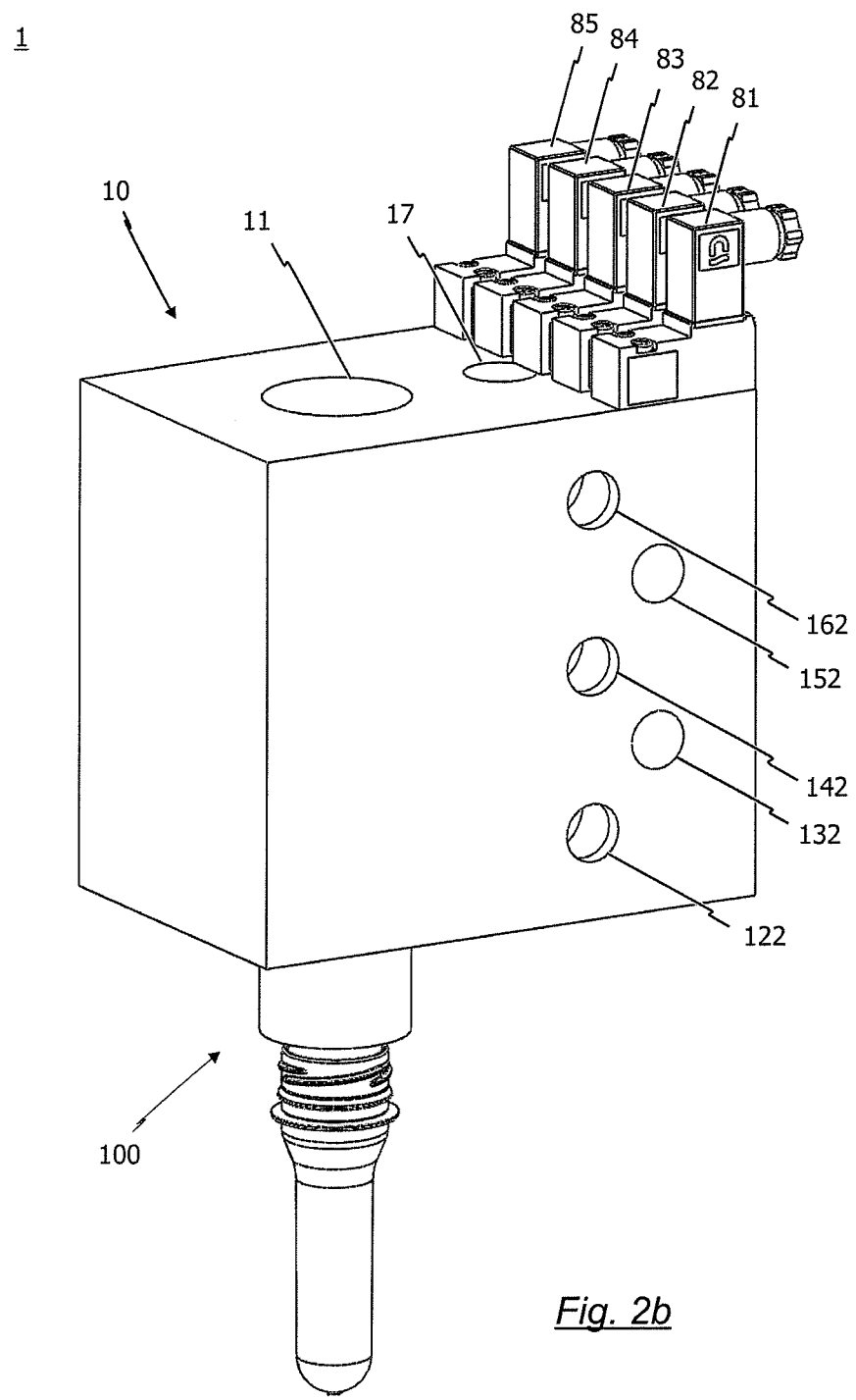
FIG. 2b shows a perspective rear view of the embodiment illustrated in FIG. 1 without connecting block.

A perspective view of a first embodiment of the device according to the invention for controlling blowing mediums in a stretch blow moulding machine is illustrated in FIGS. 1 to 2b. According to these figures, the device comprises a housing block 10 with a first through-bore 11 that is configured for accommodating a blow nozzle 100. In particular, the through-bore 11 is realized as to be cylindric and extends from the top side of the housing block 10 illustrated in FIG. 1 to the not-shown bottom side.

Control valves 20, 30, 40, 50 and 60 are also located in the housing block 10, wherein these control valves are connected to the first through-bore 11 and configured for selectively connecting the blow nozzle 100 accommodated in the through-bore 11 to a respective fluid connection. The fluidic connection between the valves 20, 30, 40, 50 and the first through-bore 11 is described below with reference to the illustrations in FIGS. 3 to 5.

The housing block 10 comprises a number of valve channels 12, 13, 14, 15 and 16 that corresponds to the number of valves, wherein these valve channels serve for accommodating the valves 20, 30, 40, 50 and 60 within the housing block 10. Thereby, the valve channels 12, 13, 14, 15 and 16 respectively are in fluid communication with the first through-bore 11 as illustrated, for example, in FIG. 3.

Figure 3:
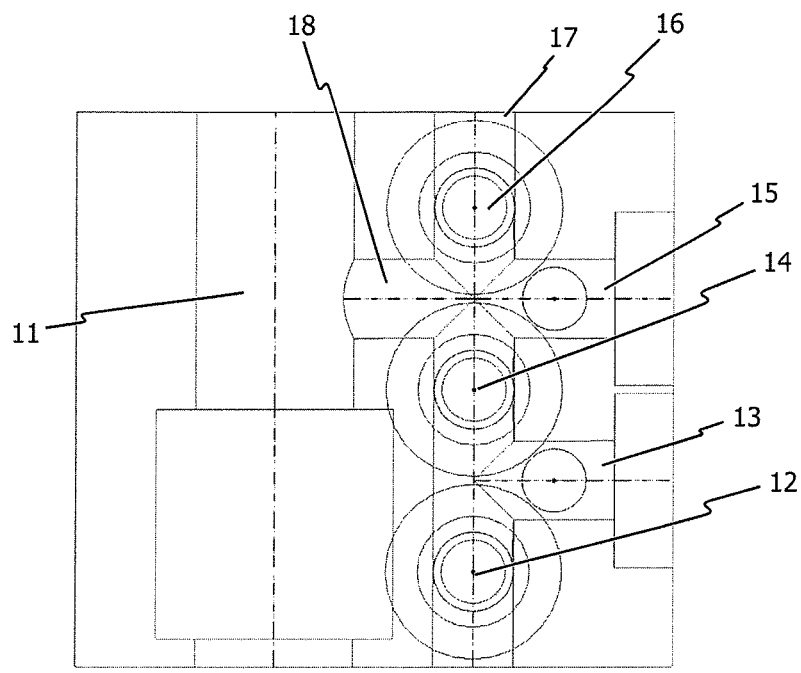
FIG. 3 shows a cross section through the housing block of the first embodiment illustrated in FIG. 1.

FIG. 3 shows that the first, second, third, fourth and fifth valve channels 12, 13, 14, 15, 16 are connected to one another by means of a second through-bore 17, wherein the second through-bore 17 is connected to the first through-bore 11 via a connecting channel 18. The second through-bore 17 is accordingly realized in the form of a collecting pipe because it is in fluid communication with the high-pressure side of each valve 12, 13, 14, 15, 16 or valve channel 20, 30, 40, 50, 60, respectively.

Figure 5:
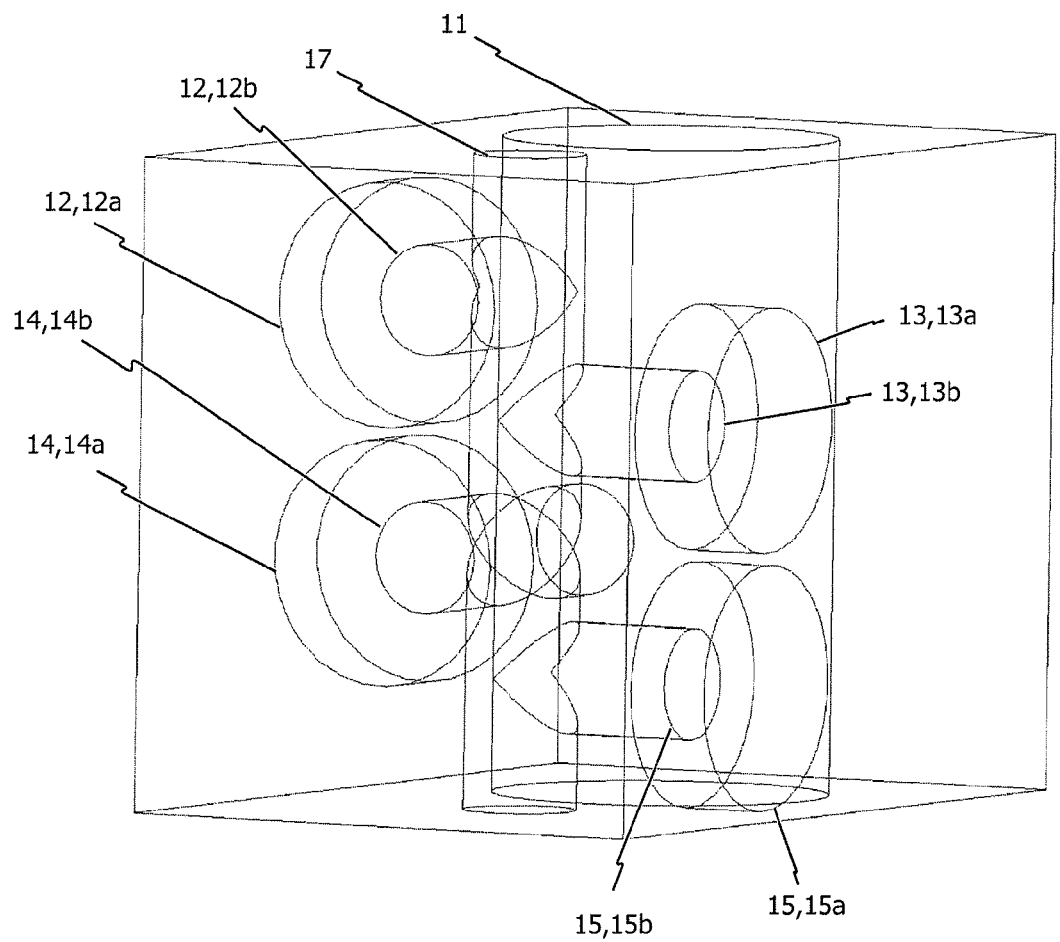
FIG. 5 shows a schematic perspective view of a housing block with valve channels arranged in a crosswise manner.

The arrangement of the valve channels 12, 13, 14, 15, 16 relative to the housing block 10 is illustrated, for example, in the schematic view according to FIG. 5. At this point, it should be noted that, in contrast to FIG. 1, only 4 valve channels 12, 13, 14 and 15 are illustrated in FIG. 5 in order to provide a better overview. The valve channels 12, 13, 14, 15 respectively are aligned essentially perpendicular to the first through-bore 11. In addition, the first valve channel 12 is aligned essentially perpendicular to the second valve channel 13 such that the first and the second valve (not illustrated in FIG. 5) are arranged crosswise. Likewise, this applies to the third and fourth valve channels 14 and 15 that are also arranged crosswise, i.e. essentially perpendicular to one another and to the first through-bore 11. In other words, every second valve channel 12 and 14 or 13 and 15, respectively, is aligned parallel and intersects the other respective valve channels 13, 15 or 12, 14, respectively, that lie in between.

According to FIG. 5, this allows to achieve a particularly dense arrangement of the valve channels 13, 14, 15 and therefore of the valves. The dead air volume is significantly reduced in this way. It should be once again noted that "essentially" perpendicular means that the individual valve channels 12, 13, 14, 15 and 16 do not necessarily have to be arranged at an angle of 90° relative to one another. In fact, this formulation includes any angle that allows a crosswise arrangement of the valves 20, 30, 40, 50 and 60.

FIG. 5 furthermore shows that the valve channels 12, 13, 14, 15 respectively comprise a region with a large diameter 12a, 13a, 14a, 15a, as well as a region with a smaller diameter 12b, 13b, 14b, 15b. The reason for this can be seen in that the respective valves 20, 30, 40, 50, 60 preferably comprise a control side (61 in FIG. 4) that faces away from the first through-bore 11 and has a diameter that is larger than the diameter of a high-pressure side (62 in FIG. 4) of the respective valve (20, 30, 40, 50, 60) that faces the first through-bore 11. Especially this embodiment of the control valves 20, 30, 40, 50, 60 allows to reduce the "dead air volume" particularly well due to the crosswise arrangement of the valves.

Figure 4:
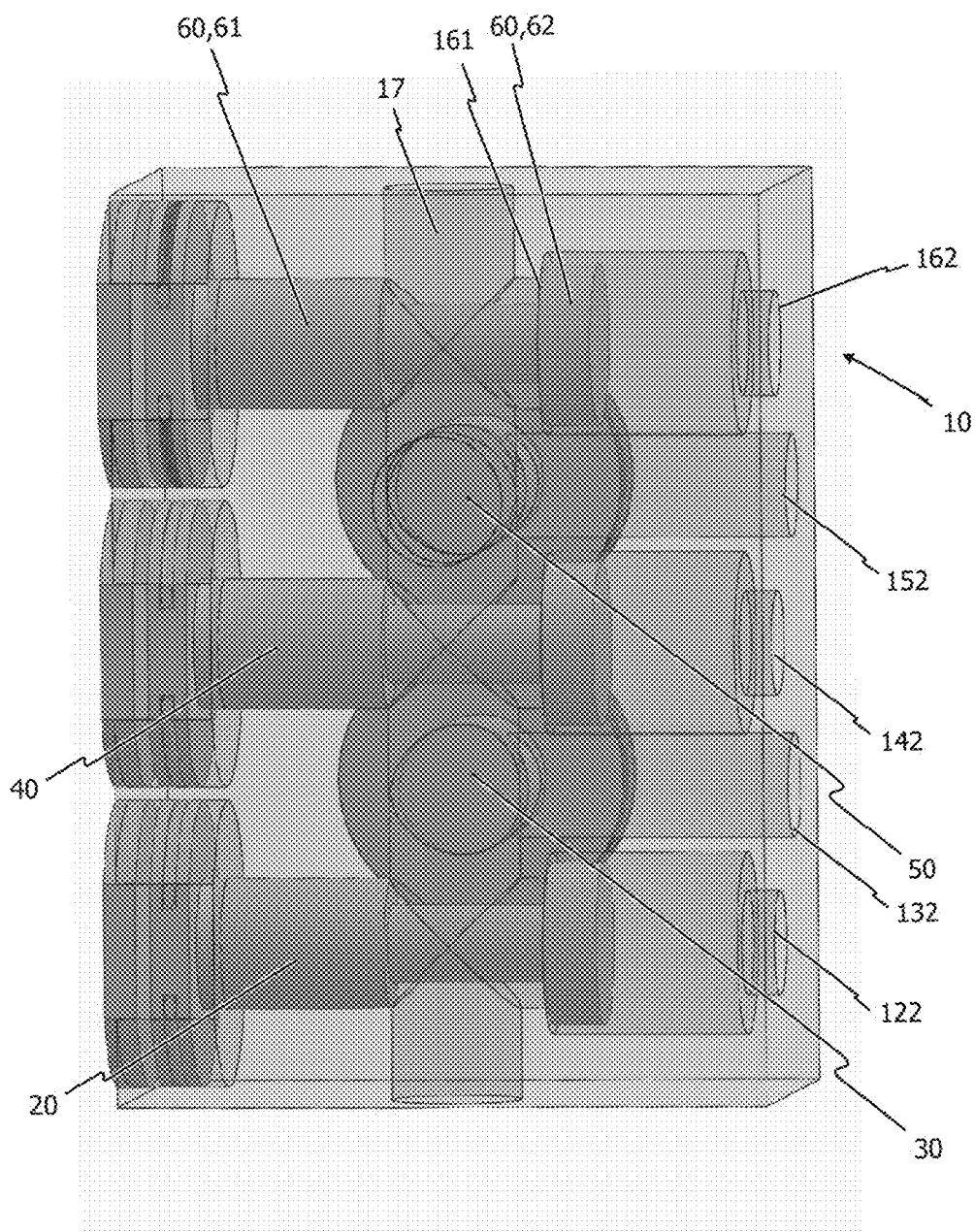
FIG. 4 shows a half section through the first embodiment illustrated in FIG. 1.

Using the example of the fifth valve 60, FIG. 4 furthermore shows that the valves 20, 30, 40, 50, 60 are in the resting state prestressed against the valve seat 161 of the respective valve channel 16 with their high-pressure side 62 by means of a (not-shown) preload spring. Accordingly, the valves 20, 30, 40, 50 and 60 are closed in their resting state, i.e. no pressurization of the blow nozzle 100 located in the first through-bore 11 occurs initially.

A connection between the respective fluid connection 122, 132, 142, 152, 162 and the blow nozzle 100 located in the first through-bore 11 is not produced until the valves 20, 30, 40, 50, 60 are actuated by the pilot valves 81, 82, 83, 84, 85 illustrated in FIGS. 1 and 2, because the respective valve 20, 30, 40, 50, 60 is displaced toward the right from its resting position illustrated in FIG. 4 such that the part 62 of the valve 60 located on the high-pressure side is lifted off the valve seat 161, thus creating a fluid communication to the collecting channel 17.

Although not explicitly illustrated in FIG. 4, the respective pilot valve 81 to 85 may be connected to the control side 61 of the valve 60 via a corresponding control air channel.

Reverting to FIG. 2a, it should furthermore be noted that the device according to the invention preferably comprises a connecting block 70 that is detachably connected to the housing block 10. The connecting block 70 is configured for connecting each of the fluid connections 122, 132, 142, 152, 162 (FIG. 2b) to a connecting line 71, 72, 73, 74 and 75. In this case, the connecting lines 71, 72, 73, 74, 75 respectively produce a fluid communication to a compressed air reservoir or an air vent opening. The connecting block 70 is preferably arranged on the housing block 10 of the device 1 by means of fastening elements (such as not-shown fastening screws). Consequently, the connecting lines 71, 72, 73, 74, 75 can be connected to the fluid connections 122, 132, 142, 152, 162 in one step.

The present invention is not limited to the special embodiments illustrated in the figures. In fact, the invention results from a combination of the features disclosed herein. It should be noted, for example, that the present invention is not limited to the five valves or valve channels illustrated in the figures. In fact, an arbitrary number of valves may be provided. It is merely decisive that the valves are arranged "crosswise," i.e. alternately arranged essentially perpendicular to one another.

The invention claimed is:

1. A device for controlling blowing mediums in a stretch blow moulding machine for producing hollow bodies of heated preforms, wherein the device comprises the following:
   a housing block with a first through-bore for accommodating at least one blow nozzle;
   a first valve that is in fluid communication with the first through-bore and configured for selectively connecting a blow nozzle accommodated in the through-bore to a first fluid connection;
   a second valve that is in fluid communication with the first through-bore and configured for selectively connecting the blow nozzle accommodated in the through-bore to a second fluid connection,
   wherein the housing block furthermore comprises first and second valve channels for accommodating the first and the second valve within the housing block, wherein the first and second valve channels are in fluid communication with the first through-bore, wherein the first and the second valve channel are essentially aligned perpendicular to the first through-bore, wherein the first and the second valve channel are aligned at an angle between 70° and 110° relative to each other and spaced apart from each other with regard to the length extension of the first through-bore such that the first and the second valve are arranged crosswise.

2. The device according to claim 1, wherein the first valve channel is essentially aligned perpendicular to the second valve channel such that the first and the second valve are arranged crosswise.

3. The device according to claim 1, wherein the housing block furthermore comprises a second through-bore that is realized in the form of a collecting channel, wherein this second through-bore essentially extends parallel to the first through-bore and is in fluid communication with the first and the second valve channel, as well as with the first through-bore.

4. The device according to claim 1,
   wherein the device furthermore comprises a third, fourth and fifth valve that respectively are in fluid communication with the first through-bore and configured for selectively connecting the blow nozzle accommodated in the through-bore to a third, fourth or fifth fluid connection,
   and wherein the housing block furthermore comprises third, fourth and fifth valve channels for accommodating the third, fourth and fifth valves within the housing block, wherein the third, fourth and fifth valve channels are in fluid communication with the first through-bore.

5. The device according to claim 4, wherein at least one of the valves is realized in the form of a low-pressure valve, at least one of the valves is realized in the form of a high-pressure valve and at least one of the valves is realized in the form of an air vent valve.

6. The device according to claim 5, wherein at least one of the valves is realized in the form of a recycling valve.

7. The device according to claim 4,
   wherein the third, fourth and fifth valve channels are essentially aligned perpendicular to the first through-bore, and wherein the first, third and fifth valve channels are respectively aligned essentially perpendicular to the second and fourth valve channel such that the valves are arranged crosswise.

8. The device according to claim 7, wherein the housing block is essentially realized rectangular and the first, third and fifth valve channel are respectively arranged on a first lateral face of the housing block.

9. The device according to claim 8, wherein the second and fourth valve channel are respectively arranged on a second lateral face of the housing block that extends perpendicular to the first lateral face.

10. The device according to claim 1, wherein the valves respectively comprise a control side that faces away from the first through-bore and has a diameter that is larger than the diameter of a high-pressure side of the respective valve that faces the first through-bore.

11. The device according to claim 1, wherein the device furthermore comprises a connecting block that is detachably connected to the housing block and configured for connecting each of the fluid connections to a connecting line.

12. The device according to claim 1, wherein the device comprises at least one pilot valve for each valve, wherein said pilot valves are detachably connected to the housing block and configured for actuating the valves located in the housing block.

13. The device according to claim 12, wherein the pilot valves are realized in the form of pneumatic valves.

14. A blow moulding machine with at least one blowing mould for producing a hollow body of heated preforms, as well as at least one device comprising:
   a housing block with a first through-bore for accommodating at least one blow nozzle;
   a first valve that is in fluid communication with the first through-bore and configured for selectively connecting a blow nozzle accommodated in the through-bore to a first fluid connection;
   a second valve that is in fluid communication with the first through-bore and configured for selectively connecting the blow nozzle accommodated in the through-bore to a second fluid connection,
   wherein the housing block furthermore comprises first and second valve channels for accommodating the first and the second valve within the housing block, wherein the first and second valve channels are in fluid communication with the first through-bore, wherein the first and the second valve channel are essentially aligned perpendicular to the first through-bore, wherein the first and the second valve channel are aligned at an angle between 70° and 110° relative to each other and spaced apart from each other with regard to the length extension of the first through-bore such that the first and the second valve are arranged crosswise.

15. The blow moulding machine according to claim 14,
   wherein the device furthermore comprises a third, fourth and fifth valve that respectively are in fluid communication with the first through-bore and configured for selectively connecting the blow nozzle accommodated in the through-bore to a third, fourth or fifth fluid connection,
   and wherein the housing block furthermore comprises third, fourth and fifth valve channels for accommodating the third, fourth and fifth valves within the housing block, wherein the third, fourth and fifth valve channels are in fluid communication with the first through-bore.

16. The blow moulding machine according to claim 15, wherein at least one of the valves is realized in the form of a low-pressure valve, at least one of the valves is realized in the form of a high-pressure valve and at least one of the valves is realized in the form of an air vent valve.

17. The blow moulding machine according to claim 14, wherein the third, fourth and fifth valve channels are essentially aligned perpendicular to the first through-bore, and wherein the first, third and fifth valve channels are respectively aligned essentially perpendicular to the second and fourth valve channel such that the valves are arranged crosswise.

18. The blow moulding machine according to claim 17, wherein the housing block is essentially realized rectangular and the first, third and fifth valve channel are respectively arranged on a first lateral face of the housing block.

19. The blow moulding machine according to claim 18, wherein the second and fourth valve channel are respectively arranged on a second lateral face of the housing block that extends perpendicular to the first lateral face.

* * * * *